(12) United States Patent
Granados et al.

(10) Patent No.: US 11,505,497 B2
(45) Date of Patent: Nov. 22, 2022

(54) FIREPROOF COMPOSITIONS AND MATERIALS

(71) Applicant: ADENIUM IBÉRICA, S.L., Madrid (ES)

(72) Inventors: Luis Sánchez Granados, Madrid (ES); Manuel Cruz Yusta, Madrid (ES); José Balbuena Jurado, Madrid (ES); Luis Fuertes Martínez, Madrid (ES)

(73) Assignee: ADENIUM IBÉRICA, S.L., Madrid (ES)

( * ) Notice: Subject to any disclaimer, the term of this patent is extended or adjusted under 35 U.S.C. 154(b) by 0 days.

(21) Appl. No.: 17/259,525

(22) PCT Filed: Jul. 11, 2019

(86) PCT No.: PCT/ES2019/070486
§ 371 (c)(1),
(2) Date: Jan. 11, 2021

(87) PCT Pub. No.: WO2020/012053
PCT Pub. Date: Jan. 16, 2020

(65) Prior Publication Data
US 2021/0163358 A1 Jun. 3, 2021

(30) Foreign Application Priority Data
Jul. 11, 2018 (ES) .............. ED201830696

(51) Int. Cl.
| | | |
|---|---|---|
| C04B 28/02 | (2006.01) |
| C04B 18/02 | (2006.01) |
| C04B 22/00 | (2006.01) |
| C04B 103/12 | (2006.01) |
| C04B 103/63 | (2006.01) |
| C04B 111/28 | (2006.01) |
| C04B 111/40 | (2006.01) |

(52) U.S. Cl.
CPC .......... C04B 28/021 (2013.01); C04B 18/027 (2013.01); C04B 22/0093 (2013.01); C04B 2103/12 (2013.01); C04B 2103/63 (2013.01); C04B 2111/28 (2013.01); C04B 2111/40 (2013.01)

(58) Field of Classification Search
CPC ........... C04B 7/02; C04B 14/06; C04B 14/18; C04B 14/106; C04B 14/185; C04B 14/202; C04B 14/386; C04B 14/42; C04B 16/06; C04B 18/027; C04B 18/08; C04B 20/002; C04B 20/0048; C04B 20/0076; C04B 22/064; C04B 22/0093; C04B 28/006; C04B 28/021; C04B 28/18; C04B 28/26; C04B 40/0608; C04B 2103/0088; C04B 2103/12; C04B 2103/63; C04B 2111/00163; C04B 2111/00181; C04B 2111/28; C04B 2111/40; Y02P 40/10; Y02W 30/91

See application file for complete search history.

(56) References Cited

U.S. PATENT DOCUMENTS

| | | | |
|---|---|---|---|
| 7,727,330 B2 * | 6/2010 | Ordonez ................. C04B 7/243 |
| | | | 106/789 |
| 9,919,974 B2 * | 3/2018 | Gong .................... C04B 28/006 |
| 2005/0066859 A1 | 3/2005 | Lee et al. |
| 2011/0177188 A1 * | 7/2011 | Bredt ........................ B28B 1/00 |
| | | | 106/38.3 |
| 2012/0172469 A1 | 7/2012 | Perez-Pena |
| 2015/0345132 A1 | 3/2015 | Huang |

FOREIGN PATENT DOCUMENTS

| | | |
|---|---|---|
| CN | 105330219 A | 2/2016 |
| CN | 106927735 A | 7/2017 |
| CN | 107840617 A | 3/2018 |
| CN | 107986720 A | 5/2018 |
| CN | 108264323 A | 7/2018 |
| KR | 20180007647 A | 1/2018 |
| KR | 20180030373 A | 3/2018 |
| WO | 2008157714 A1 | 12/2008 |
| WO | 2011104007 A3 | 9/2011 |

OTHER PUBLICATIONS

International Search Report issued in connection with PCT Application No. PCT/ES2019/070486 dated Sep. 16, 2019.

* cited by examiner

Primary Examiner — Anthony J Green
(74) Attorney, Agent, or Firm — Dennemeyer & Associates; Steven M. Shape

(57) ABSTRACT

The present invention relates to a composition in the form of a mixture comprising F-type fly ash, a reactive silicon source, a setting accelerator and a light aggregate with a density of less than 900 kg/m³ and a mechanical strength of at least 0.08 MPa, and the uses thereof to obtain light and fireproof construction materials.

21 Claims, No Drawings

FIREPROOF COMPOSITIONS AND MATERIALS

CROSS-REFERENCE TO RELATED APPLICATIONS

This is a 35 U.S.C. 371 National Stage Patent Application of International Application No. PCT/ES2019/070486, filed Jul. 11, 2019, which claims priority to Spanish application 201830696, filed Jul. 11, 2018, each of which is hereby incorporated by reference in its entirety.

BACKGROUND ART

Fireproof materials are highly desirable in the field of construction, due to the combustibility of the most commonly used construction materials. Moreover, it is desirable for said materials to be lightweight to facilitate the handling and application thereof.

US2012172469 A1 describes lightweight cementitious compositions based on fly ash with an alkali metal salt of citric acid intended for obtaining lightweight compositions with a high compressive strength and water resistance that set quickly, without seeking fire resistance.

CN106927735A describes a mortar with fly ash, rice husks and silica smoke and its use as a thermal insulator for covering walls.

WO2008157714 A1 describes compositions comprising cenospheres, a silicate base, and an organosilane compound, obtained in aqueous solution for obtaining materials with fire resistance.

WO2011104007 A2 describes an aqueous composition with cenospheres, ceramic fibres, colloidal silica and other components for its use in the fire protection of walls and ceilings.

There is a need to find fireproof materials with a high fire resistance that also have a low density and are environmentally friendly.

DESCRIPTION OF THE INVENTION

The compositions of the present invention are outstanding for preparing fireproof materials, particularly as they have excellent fire resistant properties and their density is low enough to allow their use in wall and ceiling gunning. In addition, these compositions can be used to prepare lightweight fireproof panels, easy to transport and install, and with outstanding fireproof properties. A highly advantageous aspect of the present invention is that it uses waste such as fly ash as the main component thereof, which makes the fireproof product very environmentally friendly given its low carbon footprint. Another advantage of the present invention is that once exposed to fire the fireproof material becomes even more resistant to fire.

The fact that the compositions of the present invention are dry mixtures is extremely convenient for their stability during storage and transport, as well as for the ease in their final use.

In addition, the compositions of the present invention set at ambient temperature, so that they do not require a temperature treatment which, in applications of gunning walls and ceilings, would be complex and expensive.

The inventors of the present invention have found that the compositions in mixture as defined in the claims are particularly advantageous for projection on walls and ceilings, since they have an excellent adhesion, can set at ambient temperature reaching optimum mechanical strength and, particularly, present unexpected fire resistant properties. Similarly, the inventors have found that the compositions of the present invention can be used to form panels in moulds that also present a mechanical strength allowing their removal from the mould, storage, and transport to their location of final use, and particularly have highly convenient fire resistant properties for the field of construction.

In a first aspect, the present invention relates to a composition in a dry mixture form comprising:
- between 30 and 80% by weight of type F fly ash,
- between 0 and 30% by weight of a reactive silicon source,
- at least 1.5% by weight of a solid alkaline agent,
- at least 0.5 and 10% of a setting accelerant, and
- between 2 and 15% by weight of a lightweight aggregate, where the % by weight is with respect to the total weight of the composition in a dry mixture form, said composition has a density under 900 kg/m$^3$ when mixed with water in a liquid/solid weight ratio of 0.5, test specimens of 4×4×16 cm are prepared and allowed to dry at ambient temperature for 28 days, measured as per UNE-EN 1015-10, where said composition has a mechanical compressive strength of at least 0.8 MPa when mixed with water in a liquid/solid weight ratio of 0.5, test specimens of 4×4×16 cm are prepared and allowed to dry at ambient temperature for 28 days, measured as per UNE-EN 1015-11, The weight of the layer is an average value obtained from several measurements using an installed thickness measurement device and measured as per UNE EN-13381-4.

Fly ashes are the finest particles generated in the combustion of coal (pulverised anthracite or other bituminous coals) in thermoelectric power plants. Fly ash is defined by Standard UNE-EN 450-1:2006+A1:2008 as "a fine powder with mainly spherical, crystalline particles produced by the combustion of pulverised coal with or without cocombustion materials, with pozzolanic properties and mainly composed of $SiO_2$ and $Al_2O_3$; the content of reactive $SiO_2$, as defined in standard EN 197-1, is at least 25% by mass. According to ASTM C Standard 618-08a, fly ashes are classified by their lime content as type or class F when they are produced by calcining anthracitic or bituminous coal and contain lime amounts less than 15% by weight.

Gunning refers to projection of the dry mixture on a surface using pressurised water.

In a preferred embodiment of the first aspect of the invention, the composition does not include a citrate salt. In another preferred embodiment, said composition has a mechanical compressive strength of at least 1.0 MPa when mixed with water in a liquid/solid weight ratio of 0.5, test specimens of 4×4×16 cm are prepared and allowed to dry at ambient temperature for 28 days, measured as per UNE-EN 1015-11, In another preferred embodiment, said composition has a density under 800 kg/m$^3$ and preferably under 700 kg/m$^3$, when mixed with water in a liquid/solid weight ratio of 0.5, test specimens of 4×4×16 cm are prepared and allowed to dry at ambient temperature for 28 days, measured as per UNE-EN 1015-10, In a preferred embodiment of the first aspect of the invention, the composition presents a fire resistance greater than 120 minutes when mixed with water in a liquid/solid ratio of 0.5, it is gunned on a HEB 240 pillar protected on its four sides to a 25 mm thickness and allowed to dry at ambient temperature for 28 days, as per UNE EN 13381-4 and UNE-EN 1363-1.

To evaluate the fire resistant properties of the composition of the invention a metal structure was used, specifically a HEB 240 profile, with dimensions as per Standard UNE-36524-94, protected on its four sides with a layer of thickness 25 mm. The thickness was measured after drying for 28 days as per Standard UNE EN 13381-4.

In a preferred embodiment of the first aspect of the invention, the composition presents a fire resistance greater than 60 minutes when mixed with water in a liquid/solid ratio of 0.5, it is gunned on a HEB 240 pillar protected on its four sides to a 13 mm thickness and allowed to dry at ambient temperature for 28 days, as per UNE EN 13381-4 and UNE-EN 1363-1.

In a preferred embodiment of the first aspect of the invention, the composition comprises between 35% and 70% by weight of type F fly ash with respect to the total weight of the composition in a dry mixture form. Preferably, the composition comprises between 40% and 60% by weight of type F fly ash with respect to the total weight of the composition in a dry mixture form. More preferably, the composition comprises between 42% and 55% by weight of type F fly ash with respect to the total weight of the composition in a dry mixture form.

In a preferred embodiment of the first aspect of the invention, the composition comprises between 5% and 30% by weight of a reactive silicon source with respect to the total weight of the composition in a dry mixture form. In a preferred embodiment of the first aspect of the invention, the composition comprises between 10% and 25% by weight of a reactive silicon source with respect to the total weight of the composition in a dry mixture form. In a preferred embodiment of the first aspect of the invention the reactive silicon source comprises at least one silicate, preferably sodium silicate, more preferably pentahydrate sodium metasilicate. A reactive source of silicon is understood as a source of silicon that does not need to be previously activated to react chemically.

In a preferred embodiment of the first aspect of the invention, the composition comprises between 2 and 10% by weight of a solid alkaline agent with respect to the total weight of the composition in a dry mixture form. Preferably, the solid alkaline agent includes sodium. More preferably the solid alkaline agent includes lye. In a preferred embodiment, the alkaline agent is lye.

In a preferred embodiment of the first aspect of the invention, the composition comprises between 2 and 8% by weight of a setting accelerant with respect to the total weight of the composition in a dry mixture form. Preferably, the setting accelerant comprises a source of calcium. More preferably, the setting accelerant includes $Ca(OH)_2$.

In a preferred embodiment of the first aspect of the invention, the composition comprises between 4 and 10% by weight of a lightweight aggregate, with respect to the total weight of the composition in a dry mixture form. A lightweight aggregate is understood to be a granulated material used as raw material in construction with chemical stability and mechanical strength. Preferably, the lightweight aggregate is selected from among sand, gravel, arlite, perlite, vermiculite and mixtures thereof. Preferably, the lightweight aggregate includes perlite. Preferably, the lightweight aggregate includes vermiculite. More preferably, the lightweight aggregate is a mixture of perlite and vermiculite. In a preferred embodiment, the lightweight aggregate has a mean grain size under 2 mm when measured by laser diffraction.

In a preferred embodiment of the first aspect of the invention, the composition additionally comprises at least one solid cement. Preferably, it comprises between 0.5% and 18% by weight of a solid cement with respect to the total weight of the composition in a dry mixture form. Also preferably, the cement or cements are selected from among Portland cement or grey cement, white cement, quick-setting cement, and mixtures thereof.

In a preferred embodiment of the first aspect of the invention, the composition additionally comprises at least one solid additive selected from among plasticisers, accelerants, retardants, aerators, and mixtures thereof. In a preferred embodiment of the first aspect of the invention the composition additionally comprises between 0.1 and 4.9% by weight of a solid additive selected from among plasticisers, accelerants, retardants, aerators, and mixtures thereof, with respect to the total weight of the composition in a dry mixture form. In a preferred embodiment of the first aspect of the invention, the composition additionally comprises at least one fibre. It preferably comprises at least one fibre in a proportion less than 1% by weight with respect to the total weight of the composition in a dry mixture form. Preferably, the fibre is selected from among glass fibre, glass wool, or carbon fibre. Examples of additives are MasterCast 930 (aerator and plasticiser), MasterCast 560 (retardant-plasticiser), MasterCast 228P (superplasticiser) by the BASF corporation.

In a preferred embodiment of the first aspect of the invention, the composition comprises.

| | |
|---|---|
| Ash (type F) | 30-80% by weight |
| $Na_2SiO_3$ | 0-30% by weight |
| Solid alkaline agent comprising sodium | 2-10% by weight |
| Setting accelerant | 2-8% by weight |
| Lightweight aggregates | 2-15% by weight |
| Cement | 0.5-18% by weight |
| Additive | 0-4.9% by weight | with respect to the total weight of the composition in a dry mixture form,

A second aspect of the present invention relates to a process for preparing the composition of the first aspect, which comprises dry mixing of the components.

A third aspect of the present invention relates to a process for applying the composition of the first aspect that consists in projecting the solid mixture obtained according to the preceding claim by a water flow in which the liquid/solid weight ratio is between 0.2 and 0.6, preferably between 0.3 and 0.5. The composition in dry mixture form is mixed with water in the specified ratio for 1 to 120 seconds and gunned on the desired surface, or poured into the desired mould to make panels.

A fourth aspect of the present invention relates to the use of a composition of the first aspect for fireproof protection of surfaces. Preferably, the composition is applied by gunning. Also preferably, the composition is applied in successive layers. In a preferred embodiment, the composition is applied in successive layers with a thickness between 1 and 35 mm for each layer, measured after drying for 28 days as per Standard UNE EN 13381-4.

Preferably, the final thickness of the composition is between 10 and 70 mm, preferably between 15 and 40 mm, more preferably between 20 and 30 mm, measured after drying for 28 days as per Standard UNE EN 13381-4.

In a fifth aspect, the present invention also relates to a panel obtained from the composition of the first aspect. Preferably, said panel is obtained when said composition is mixed with water in a liquid/solid ratio between 0.2 and 0.6 for 1 to 120 seconds, poured into a mould with the desired dimensions and cured at ambient temperature. The panel of the present invention has a density under 800 kg/m³, preferably under 800 kg/m³, more preferably under 700 kg/m³.

In addition, the panel of the present invention has a compressive mechanical strength of at least 0.8 MPa, preferably at least 1.0 MPa.

In a sixth aspect, the present invention relates to a composition in a dry mixture form comprising:
between 30 and 80% by weight of type F fly ash,
between 1 and 9% by weight of a reactive silicon source,
between 1 and 15% by weight of a setting accelerant,
between 2 and 30% by weight of lightweight aggregates,
where the % by weight is with respect to the total weight of the composition in a dry mixture form, and
where said composition in a dry mixture form has an apparent density between 200 and 600 kg/m$^3$, preferably between 150 and 550 kg/m$^3$, more preferably between 200 and 500 kg/m$^3$.

The density of the composition in a dry mixture form is measured according to the calibrated funnel method. The calibrated funnel method consists in using a funnel placed at a fixed distance above a container with a 1 litre volume. Said funnel has a closing system at its outlet. Under the funnel is a cylindrical container with a volume of 1 litre. The method is carried out by filling the funnel with the dry mixture in powder form. The composition is poured through the funnel and the cylinder is filled flush to the brim with the aid of a spatula. The apparent density is calculated by dividing the weight of the composition in the cylinder by the volume of the cylinder (1 litre).

The composition of the present invention has outstanding fire resistant properties, combined with good mechanical strength and low density. Surprisingly, these compositions show excellent performance when gunned on the surface of different construction materials, as well as excellent adhesion. Moreover, the compositions are safe to operate by workers, as they do not reach high temperatures when mixed with water for application.

In a preferred embodiment of this composition the fly ash is not sieved and/or not ground, or the particle size of the fly ash is not selected.

In a preferred embodiment of this composition, the composition does not comprise between 2 and 4% by weight of gypsum with respect to the total weight of the composition in a dry mixture form, preferably not containing gypsum.

In another preferred embodiment of the composition, the reactive source of silicon is other than rice husk ash, and preferably this composition does not comprise between 0.01% and 20% by weight of rice husk ash with respect to the total weight of the composition in a dry mixture form, preferably not containing rice husk ash.

In another preferred embodiment of this composition, the composition does not comprise between 1.5% and 50% by weight, preferably does not comprise between 3% and 5% by weight or does not comprise between 1.5% and 10% by weight of an alkaline agent, with respect to the total weight of the composition in a dry mixture form. Preferably, the composition does not comprise any alkaline agent. Preferably, the composition does not comprise any solid alkaline agent. Preferably, the composition does not comprise NaOH. More preferably, the composition does not comprise an alkaline agent that includes sodium.

In a preferred embodiment of the sixth aspect, the composition has an apparent density between 400 and 900 kg/m$^3$, when mixed with water in a liquid/solid weight ratio between 0.7 and 0.9, preferably between 450 and 850 kg/m$^3$, more preferably between 500 and 800 kg/m$^3$, measured as per UNE EN 1015-6 before 5 minutes after mixing with water.

In a preferred embodiment of the sixth aspect, said composition has a density between 200 and 600 kg/m$^3$ and preferably between 250 and 550 kg/m$^3$, more preferably between 300 and 500 kg/m$^3$ when mixed with water in a liquid/solid weight ratio between 0.7 and 0.9, test specimens of 4×4×16 cm are prepared and allowed to dry at ambient temperature for 28 days, measured as per UNE-EN 1015-10, In another preferred embodiment of the sixth aspect, the composition comprises between 40% and 60% by weight, preferably comprises more than 40% by weight and less than 45% of type F fly ash, with respect to the total weight of the composition in a dry mixture form.

In a preferred embodiment of the sixth aspect, the composition comprises between 2% and 7%, preferably between 3 and 6% by weight of a reactive silicon source with respect to the total weight of the composition in a dry mixture form. In a preferred embodiment of the sixth aspect, the reactive silicon source is a reactive source of silicon and aluminium. Preferably, the reactive silicon source is a natural pozzolan, preferably a calcined natural pozzolan. Preferably, the reactive silicon source is selected from among metakaolin and an activated clay; more preferably, the reactive silicon source is metakaolin.

The term "natural pozzolan" as used herein means a product with pozzolanic activity that is found in nature, or a product with pozzolanic activity that is found in nature and has been activated by heating to temperatures between 500 and 800° C.

In a preferred embodiment of the sixth aspect, the composition comprises between 5% and 30% by weight of lightweight aggregates, preferably between 10% and 30% by weight of lightweight aggregates, with respect to the total weight of the composition in a dry mixture form. Preferably, the lightweight aggregate is selected from among sand, gravel, arlite, perlite, vermiculite and mixtures thereof, preferably selected from among perlite and vermiculite and mixtures thereof. Preferably, the lightweight aggregate is a mixture of perlite and vermiculite. In a preferred embodiment, the lightweight aggregate is perlite. In another preferred embodiment, the lightweight aggregate is vermiculite.

In a preferred embodiment of the sixth aspect, la composition comprises between 3% and 12% by weight, and preferably comprises between 4% and 9% by weight, of a setting accelerant, with respect to the total weight of the composition in a dry mixture form. Preferably, the setting accelerant is $Ca(OH)_2$.

In a preferred embodiment of the sixth aspect, the composition further comprises between 5% and 20% by weight, preferably between 5% and 18% by weight, of at least one solid cement, with respect to the total weight of the composition in a dry mixture form. In a preferred embodiment, the cement has a maximum particle size of 100 microns, measured by laser diffraction. Preferably, the cement or cements are selected from among Portland cement or grey cement, white cement, quick-setting cement, and mixtures thereof.

In a preferred embodiment of the sixth aspect, the composition additionally comprises at least one solid additive, selected from among superplasticisers, accelerants, retardants, fluidisers, water retainers, aerators, and mixtures thereof. Preferably, the composition additionally comprises between 0.02 and 4.90% by weight, preferably between 0.02% and 2.00% by weight, more preferably between 0.02% and 1.00% by weight, even more preferably between 0.02% and 0.70% by weight, of at least one solid additive selected from among superplasticisers, accelerants, retardants, fluidisers, water retainers, aerators, and mixtures thereof, with respect to the total weight of the composition in a dry mixture form.

In a preferred embodiment of the sixth aspect, the composition additionally comprises at least one fibre. Preferably it comprises at least one fibre in a proportion less than 1% by weight with respect to the total weight of the composition in a dry mixture form. Preferably, the fibre is selected from among glass fibre, glass wool, or carbon fibre.

In a preferred embodiment of the sixth aspect, the composition presents a mechanical compressive strength of at least 0.6 MPa, preferably between 0.6 and 1.4 MPa, more preferably between 0.7 and 1 MPa, when the composition is mixed with water in a liquid/solid weight ratio of 0.7 to 0.9, test specimens of 4×4×16 cm are prepared and allowed to dry at ambient temperature for 28 days, as per UNE-EN 1015-11.

In a preferred embodiment of the sixth aspect, the composition presents a resistance to fire greater than 60 minutes when the composition is mixed with water in a liquid/solid weight ratio of 0.7 to 0.9, the mixture is gunned on an HEB 240 pillar protected on its four faces with a thickness of 13 mm and allowed to dry at ambient temperature for 28 days, as per UNE-EN 13381-4 and UNE-EN 1363-1.

A preferred embodiment of the sixth aspect is a composition comprising, preferably essentially consisting of, more preferably consisting of, between 40 and 60% by weight of type F fly ash,
between 2 and 7% by weight of a reactive silicon source,
between 3 and 12% of a setting accelerant,
between 5 and 30% by weight of lightweight aggregates,
between 5 and 20% by weight of at least one cement,
between 0.1 and 0.99% by weight of at least one fibre,
between 0.02 and 1.00% by weight of at least one additive,
with respect to the total weight of the composition in a dry mixture form.

Preferably, said composition lacks any solid alkaline agent, more preferably lacks NaOH.

Another preferred embodiment of the sixth aspect is a composition comprising, preferably essentially consisting of, more preferably consisting of, between 40 and 45% by weight of type F fly ash,
between 3 and 6% by weight of a reactive silicon source,
between 4 and 9% of a setting accelerant,
between 10 and 30% by weight of lightweight aggregates,
between 5 and 18% by weight of at least one cement,
between 0.5 and 0.99% by weight of at least one fibre,
between 0.02 and 0.70% by weight of at least one additive,
with respect to the total weight of the composition in a dry mixture form.

Preferably, said composition lacks any solid alkaline agent, more preferably lacks NaOH.

A seventh aspect of the present invention relates to a composition comprising the composition of the sixth aspect and water in a liquid/solid ratio by weight of between 0.5 and 0.95, preferably between 0.6 and 0.9, more preferably between 0.7 and 0.9.

An eighth aspect of the present invention relates to a process for preparing the composition of the sixth aspect, which comprises dry mixing of the components.

The present invention also relates to a process for preparing the composition of the seventh aspect that comprise dry mixing the components of the mixture and subsequently mixing with water.

The present invention also relates to a process for applying the composition of the sixth aspect that comprises projecting the solid mixture obtained when dry mixing the components with a water stream, where the liquid/solid ratio by weight is between 0.5 and 0.95, preferably between 0.6 and 0.9, more preferably between 0.7 and 0.9.

In addition, the present invention also relates to the use of the composition of the sixth and seventh aspects to cover or coat surfaces, preferably for the fire resistant protection of surfaces. Similarly, the present invention also relates to the use of the composition of the sixth and seventh aspects to cover or coat surfaces in construction. Preferably, the composition is applied by gunning Preferably, the composition is applied in successive layers. Preferably, the final thickness of the composition is between 5 and 70 mm, preferably between 15 and 40 mm, more preferably between 20 and 30 mm, measured after drying for 28 days at ambient temperature as per Standard UNE EN 13381-4.

In other cases the composition is used to form plates or panels. Another aspect of the present invention relates to a plate obtained from the composition. Preferably, the plate has a thickness between 10 and 80 mm, more preferably between 20 and 50 mm. In a preferred embodiment the plate can also include a textile mesh.

EXAMPLES

The invention will be better understood with reference to the following examples, although persons skilled in the art will easily appreciate that the specific examples described merely illustrate the invention.

Example 1: Compositions

The following compositions were prepared in dry mixture form. The % weight with respect to the total weight of the composition in a dry mixture form are specified:

| Type F fly ash | 30-80 | 35-70 | 40-60 |
| Reactive silicon source | 0-30 | 5-30 | 10-25 |
| Solid alkaline agent | 1.5-10 | 2-10 | 2-10 |
| Setting accelerant | 0.5-10 | 2-8 | 2-8 |
| Lightweight aggregate | 2-15 | 4-10 | 4-10 |
| Additive(s) | 0-1 | 0.1-4.9 | 0.1-2.0 |
| Fibre | 0-1 | 0-1 | 0-1 |
| Water* | 0.2-0.6 | 0.2-0.6 | 0.2-0.6 |

*Liquid/solid ratio by weight

| | | | | |
|---|---|---|---|---|
| Type F fly ash | 35-70 | 35-70 | 35-70 | 35-70 |
| Vermiculite | 1-8 | 1-8 | 1-8 | 1-8 |
| Perlite | 1-5 | 1-5 | 1-5 | 1-5 |
| Na$_2$SiO$_3$ | 10-25 | 10-25 | 10-25 | 10-25 |
| NaOH | 2-4 | 2-4 | 2-4 | 2-4 |
| Ga(OH)$_2$ | 4-6 | 4-6 | 4-6 | 4-6 |
| Aluminium | 0-1 | 0-1 | 0-1 | 0-1 |
| Glass fibre | 0-1 | — | — | 0-1 |
| Cement | — | — | 0.5-18 | 0.5-18 |
| Plasticiser | — | 0-1 | — | 0-1 |
| Water* | 0.2-0.6 | 0.2-0.6 | 0.2-0.6 | 0.2-0.6 |

*Liquid/solid ratio by weight

The components specified in the tables were dry mixed. After obtaining this dry mixture water was added in a liquid/solid ratio by weight of between 0.2 and 0.8 and mixed for 60 seconds, subsequently projecting the mixture onto a vertical surface until covering it completely. Layers between 2 and 4 mm thickness were applied to a final thickness of 25 mm. In parallel, the same mixture with water was used to fill moulds to make panels with a thickness of 25 mm.

Example 2: Compositions

The following compositions were prepared in dry mixture form. The % weight with respect to the total weight of the composition in a dry mixture form are specified:

| Type F fly ash | 30-80 | 40-60 | 40-45 |
| Reactive silicon source | 1-9 | 2-7 | 3-6 |
| Setting accelerant | 1-15 | 3-12 | 4-9 |
| Lightweight aggregate | 2-30 | 5-30 | 10-30 |
| Additive(s) | 0.02-4.90 | 0.02-2.00 | 0.02-0.70 |
| Fibre | 0-1 | 0-1 | 0.5-1 |
| Water* | 0.7-0.9 | 0.7-0.9 | 0.7-0.9 |

*Liquid/solid ratio by weight.

Example 3: Density

Unless otherwise specified, the density of the composition is calculated by dividing the mass of the test specimen dried in an oven until a constant weight in kg, by the volume of the hardened test specimen of the composition in m$^3$.

The density of the compositions of example 1 when the composition is mixed with water in a liquid/solid weight ratio of 0.5, test specimens of 4×4×16 cm are prepared and allowed to dry at ambient temperature for 28 days, measured as per UNE-EN 1015-10, was under 900 kg/m$^3$.

The density of the compositions of example 2 after mixing with water in a liquid/solid weight ratio of between 0.7 and 0.9, preparing test specimens of 4×4×16 cm and allowing to dry at ambient temperature for 28 days, measured as per UNE-EN 1015-10, was under 600 kg/m$^3$.

Example 4: Mechanical Compressive Strength

After mixing with water the composition was placed in moulds. After 28 days its compressive strength was measured. The moulds must comply with the requirements of Standard UNE-EN 1015-11 which specifies the dimensions, flatness, alignment, parallelism and surface texture thereof. After 28 days the panels are taken to the testing machine and a load is applied without acceleration, gradually increasing at a rate between 50 N/s and 500 N/s so that breakage occurs after between 30 s and 90 s, as per UNE-EN 1015-11.

The mechanical compressive strength of the compositions of example 1 when the composition was mixed with water in a liquid/solid weight ratio of 0.5, test specimens of 4×4×16 cm were prepared and allowed to dry at ambient temperature for 28 days, measured as per UNE-EN 1015-11, was at least 0.8 MPa.

The density of the compositions of example 2 when the composition is mixed with water in a liquid/solid weight ratio of between 0.7 and 0.9, test specimens of 4×4×16 cm are prepared and allowed to dry at ambient temperature for 28 days, measured as per UNE-EN 1015-11, was at least 0.6 MPa.

Example 5: Fire Resistance

The fire resistance of the compositions of both example 1 and example 2 when the composition was mixed with water in a liquid/solid weight ratio of 0.5 (example 1) or between 0.7 and 0.9 (example 2), gunned on an HEB 240 pillar protected on its four faces with a thickness of 25 mm and allowed to dry at ambient temperature for 28 days, was greater than 120 minutes, measured as per UNE EN 13381-4 and UNE-EN 1363-1.

The plate of the present invention was prepared after mixing the compositions of examples 1 or 2 with water in a liquid/solid ratio by weight of 0.5 or 0.7-0.9, respectively, applying them in moulds of varying sizes, such as 60 cm×40 cm, with a thickness of 25 mm. These plates were tested to study their fire resistant properties. After applying heat at 1000° C. for 3 minutes, heat was applied at 1200° C. on one side of the plate and the temperature at the other side of the plate was measured. After 240 minutes, the temperature at the other side only reached 300° C.

The fire resistance classification was conforming with UNE-EN 13501-2 "Classification of construction products and constructive elements according to their performance in case of fire. Part 2: Classification based on data obtained from fire resistance tests, excluding ventilation installations". This standard describes the heating curve for evaluating the performance characteristics of the element to be tested. These characteristics can be summarised as (REI), where:

R: Bearing capacity R is the ability of a construction element to preserve for a time period and without losing structural stability during exposure to fire in one or more faces, under specified mechanical actions.

E: Integrity. The integrity E is the ability of a construction element with a separating function to withstand exposure to one face only without allowing the transmission of fire to the face that is not exposed due to passage of flames or hot gases that may cause the ignition of the face that is not exposed or any material adjacent to said face.

I: Insulation. The ability of a construction element to withstand exposure to fire on one side, without transmitting the fire due to significant heat transfer from the exposed side to the unexposed side.

The invention claimed is:

1. A composition in a dry mixture form comprising:
    between 30 and 80% by weight of type F fly ash,
    between 1 and 9% by weight of a reactive silicon source,
    between 1 and 15% by weight of a setting accelerant,
    between 2 and 30% by weight of lightweight aggregates,
    wherein the % by weight is with respect to the total weight of the composition in a dry mixture form, and
    wherein said composition in a dry mixture form has an apparent density between 150 and 600 kg/m3.

2. The composition according to claim 1, wherein said composition has an apparent density between 400 and 900 kg/m3 when mixed with water in a liquid/solid weight ratio between 0.7 and 0.9, measured according to UNE EN 1015-6 before 5 minutes after mixing with water.

3. The composition according to claim 1, wherein said composition has a density between 200 and 600 kg/m3, when mixed with water in a liquid/solid weight ratio between 0.7 and 0.9, test specimens of 4×4×16 cm are prepared and allowed to dry at ambient temperature for 28 days, according to UNE-EN 1015-10.

4. The composition according to claim 1, wherein said composition comprises between 40% and 60% by weight of type F fly ash with respect to the total weight of the composition in a dry mixture form.

5. The composition according to claim 1, wherein said composition comprises between 2% and 7% by weight of a reactive silicon source with respect to the total weight of the composition in a dry mixture form.

6. The composition according to claim 1, wherein the reactive silicon source is selected from among metakaolin and an activated clay.

7. The composition according to claim 1, wherein said composition comprises between 5% and 30% by weight of lightweight aggregates with respect to the total weight of the composition in a dry mixture form.

8. The composition according to claim 1, wherein the lightweight aggregate is selected from among sand, gravel, arlite, perlite, vermiculite and mixtures thereof.

9. The composition according to claim 1, wherein said composition comprises between 3% and 12% by weight of a setting accelerant with respect to the total weight of the composition in a dry mixture form.

10. The composition according to claim 1, wherein the setting accelerant is $Ca(OH)_2$.

11. The composition according to claim 1, wherein the composition further comprises between 5% and 20% by weight of at least one solid cement, with respect to the total weight of the composition in a dry mixture form.

12. The composition according to claim 11, wherein the cement or cements are selected from among Portland cement or grey cement, white cement, quick-setting cement, and mixtures thereof.

13. The composition according to claim 1, wherein the composition presents a mechanical compressive strength of at least 0.6 MPa when the composition is mixed with water in a liquid/solid weight ratio of 0.7 to 0.9, test specimens of 4×4×16 cm are prepared and allowed to dry at ambient temperature for 28 days, measured according to UNE-EN 1015-11.

14. The composition according to claim 1, wherein said composition presents a fire resistance greater than 60 minutes when mixed with water in a liquid/solid ratio of between 0.7 and 0.9, the mixture is gunned on an HEB 240 pillar protected on its four sides with a 13 mm thickness and allowed to dry at ambient temperature for 28 days, according to UNE EN 13381-4 and UNE-EN 1363-1.

15. The composition according to claim 1, comprising:
between 40 and 60% by weight of type F fly ash,
between 2 and 7% by weight of a reactive silicon source,
between 3 and 12% of a setting accelerant,
between 5 and 30% by weight of lightweight aggregates,
between 5 and 20% by weight of at least one cement,
between 0.1 and 0.99% by weight of at least one fibre,
between 0.02 and 1.00% by weight of at least one additive,
with respect to the total weight of the composition in a dry mixture form.

16. The composition according to claim 1, comprising:
between 40 and 45% by weight of type F fly ash,
between 3 and 6% by weight of a reactive silicon source,
between 4 and 9% of a setting accelerant,
between 10 and 30% by weight of lightweight aggregates,
between 5 and 18% by weight of at least one cement,
between 0.5 and 0.99% by weight of at least one fibre,
between 0.02 and 0.70% by weight of at least one additive,
with respect to the total weight of the composition in a dry mixture form.

17. A composition comprising the compositions described in claim 1 and water in a liquid/solid weight ratio of between 0.5 and 0.95.

18. A process for preparing the composition according to claim 1 comprising dry mixing the components.

19. A process for applying the composition according to claim 1 that comprises projecting the solid mixture obtained when dry mixing the components with a water stream, where the liquid/solid weight ratio is between 0.5 and 0.95.

20. The process according to claim 19, further comprising applying the composition to a surface for fireproof protection of the surface.

21. The process according to claim 20, wherein the composition has a thickness between 5 and 70 mm, measured after drying for 28 days at ambient temperature according to Standard UNE EN 13381-4.

* * * * *